UNITED STATES PATENT OFFICE.

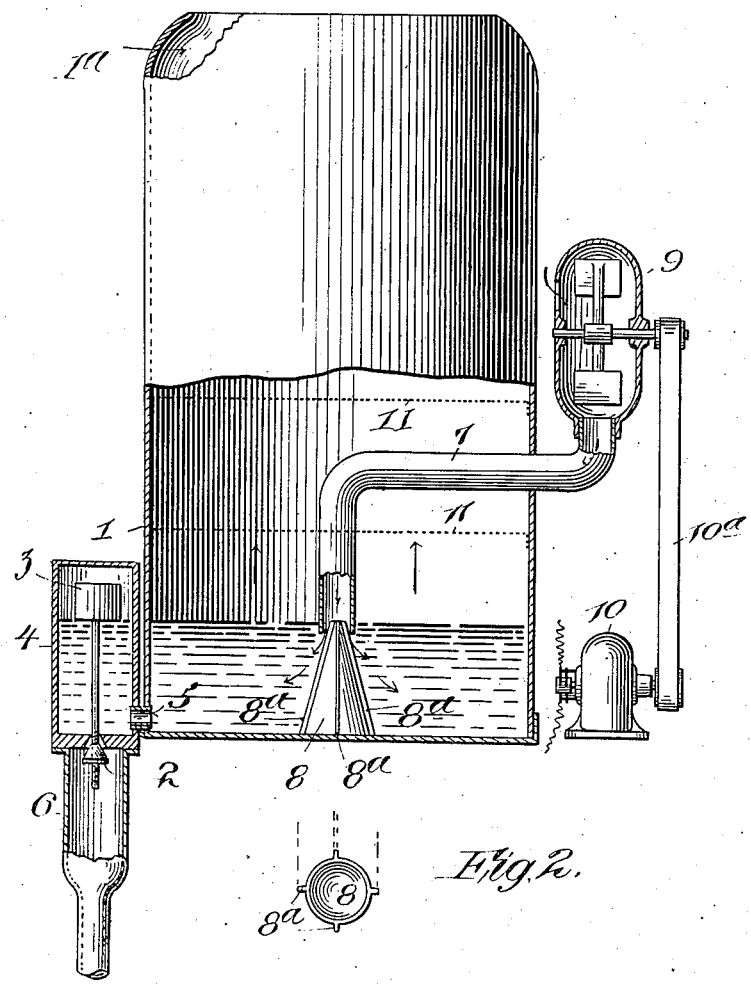

HARRY BENTZ, OF LARCHMONT, NEW YORK.

METHOD OF MOISTENING AIR.

No. 848,340.　　　　Specification of Letters Patent.　　　Patented March 26, 1907.

Application filed December 3, 1906. Serial No. 346,035.

*To all whom it may concern:*

Be it known that I, HARRY BENTZ, a citizen of the United States, and a resident of Larchmont, in the county of Westchester and State of New York, have invented certain new and useful Improvements in Methods of Moistening Air, of which the following is a specification.

The invention relates to an improvement in methods of moistening air for use in factories, rooms, compartments, and other places where moistened air is required, as in spinning and weaving rooms, malt-houses, tobacco-factories, stores, and show-cases; and it consists in the novel features and methods hereinafter described, and particularly pointed out in the claims.

It is well known that many attempts have heretofore been made to moisten air by causing the same to pass through a body of water or against fabrics saturated with water, whereby the air is caused to absorb moisture, and it is also well known that in commercial use many difficulties have been encountered in the use of the methods and means heretofore devised for moistening air and conveying it to the place or places intended to receive the same. It is a familiar fact that many devices produced for the purpose of moistening air have proven to be failures when attempts were made to place them in practical use, that many of such devices are complex and involve an expensive equipment, that many of them are only adequate for moistening the air for a medium-sized room, and that many of them have to be placed in operation for at least several hours to accomplish the first moistening of the air for a factory-room.

The broad principle of moistening air by moving the same through water or against a saturated fabric has been known for many years, and the desirability of providing moistened air for spinning and weaving rooms and other places has long been recognized, and many attempts have been made to afford adequate means for accomplishing the moistening of the air for such rooms and other places. The methods and means heretofore devised for moistening air have not, however, been universally or entirely satisfactory, and a demand has existed for means which would more rapidly and effectually moisten air for factory use.

The object of the present invention is to meet this demand and to afford a simple, adequate, and rapid process, with means for carrying the same into effect, whereby the air for a factory may be moistened rapidly and effectually to any desired degree.

In accordance with my invention I cause the air to pass into and from a body of water, but in such manner as to create a new principle of operation and one not only not heretofore practiced, but resulting in the air being very efficiently and rapidly moistened and driven into the room within which the air is to be employed. I also provide a novel apparatus for carrying my new method into effect, and this apparatus comprises, preferably, a vertically-disposed receptacle to contain a body of water, means for maintaining the water at a proper height within said receptacle, a pipe leading from above into said receptacle and having its discharge end below the surface of the water therein, means for driving the air under pressure down through said pipe and into the body of water, and means below said pipe for compelling a lateral and radial distribution of the descending volume of air through the water, the volume of air passing downwardly through the supply-pipe being comparatively large in proportion to the size of the receptacle and body of water contained therein and not being subdivided into jets or fragmentary confined divisions by mechanical means, but being compelled in large volumes and with great force to tear downwardly directly through the body of water in such manner that the water is thoroughly agitated and thrown upwardly in sprays and waves and transformed into a state of violent ebullition, the water being repeatedly driven outwardly toward the walls of the main receptacle and rapidly returning by gravity toward the center of the receptacle and at the same time numerous sprays of water being caused to ascend vertically from over the body of the same and fall back into such body. The air driven down into the water in this manner passes into direct contact with the maximum extent of the water, both during its passage down into and up through the water and through the falling sprays which are thrown upwardly by the force of the air and becomes rapidly, thoroughly, and uniformly moistened.

The invention and satisfactory means for carrying the same into effect will be fully understood from the detailed description hereinafter presented, reference being had to the accompanying drawings, in which—

Figure 1 is a side elevation, partly in section and partly broken away, of an air-moistening apparatus capable of use in the practice of the invention; and Fig. 2 is a bottom end view of a cone supplied within the main receptacle below the supply-pipe for air for causing the volume of air to travel laterally and radially when driven down into the body of water.

In the drawings, 1 designates a suitable vertical casing or receptacle, preferably constructed of sheet metal, adapted to contain the water for use in moistening the air; 6, the supply-pipe for conveying water to said receptacle; 2, a valve connected with a float 3 for automatically maintaining the water within the receptacle at a uniform level; 4, a float-chamber directly connected with said receptacle by means of a passage 5 and containing the said float; 7, the air-delivery pipe leading downwardly within said receptacle and having its discharge end below the upper surface of the water therein; 9, a suitable blower or compressor for driving the air with great force down through the pipe 7 and into the body of water; 10, a motor for driving the fan or compressor 9, and 10$^a$ a belt for transmitting motion from the shaft of the motor to the shaft of the fan 9.

The special means for maintaining the level of the water within the receptacle 1 are not separately claimed herein and are of familiar construction and operation. The fan 9 and motor 10 are also of familiar construction and require no special description. The air-pipe 7 is simply a plain pipe leading from the casing of the fan 9 to a point below the upper surface of the body of water and is uniform throughout. It is to be observed, however, that the pipe 7 is of substantial area in cross-section, my purpose being that a considerable body of air under pressure shall be constantly maintained therein and that said pipe shall serve as an air-reservoir intermediate the fan and the body of water, said body of air being added to by the fan as the discharge takes place at the lower end of said pipe.

Below the discharge end of the pipe 7 is secured upon the bottom of the receptacle a cone-shaped deflector 8, provided with downwardly and outwardly-extending flanges or ribs 8$^a$ and having its upper end set just within the discharge end of the pipe 7. The purpose of the cone 8 is to deflect the air passing from the pipe 7 laterally and radially and effect a uniform distribution of the air throughout the body of water and also to compel the air to move against the maximum extent of the water rather than to permit it to take a vertical course downwardly and immediately ascend, which would have the effect of causing the air only to contact with the middle portion of the body of water within the receptacle. The presence of the downwardly and outwardly extending surfaces of the cone 8 causes the air to be deflected laterally during its descent and travel a considerable distance from the center toward the outer edges of the body of water before it ascends. The ribs or flanges 8$^a$ serve to equalize the distribution of the air throughout the body of water, in that they without unduly dividing the air into streams or currents effect the downward passage of the air on all sides of the cone 8. I regard the presence of the deflecting-cone 8 as of considerable importance in obtaining the maximum efficiency from the apparatus, and although I do not limit my invention in every instance to the employment of a deflector below the pipe 7 I recommend that such deflector be used.

In the employment of the invention water is first allowed to flow into the receptacle 1 to the proper level therein, and then the motor 10 is set in operation, with the result that the fan 9 will be rapidly driven and force air down through the pipe 7 and into the body of water within said receptacle. The first part of the operation of the fan 9 will result in the pipe 7 above the body of water becoming charged with air under pressure, and thereupon the fan continuing in motion the air under pressure will discharge from the lower end of the pipe 7 and tear its way down along the sides of the cone 8 into and through the body of water and finally ascend through the water and pass from the top of the receptacle to the room within which it is desired to utilize the moistened air. The air descending from the pipe 7 is deflected laterally and radially by the sides of the cone 8, so that before it ascends it is compelled to travel laterally through the body of water from the central toward the outer portions of same, a part of the air ascending somewhat near the pipe 7 and larger portions of the air ascending considerably beyond the vertical plane of said pipe and substantially uniformly throughout the outer portions of the body of water. The air ascends from the body of water with great force and drives the water upwardly in the form of heavy sprays, which falling backwardly into the body of water serve to baffle and mix with the ascending air and increase the percentage of moisture the latter is compelled to absorb. The air passing into the water greatly agitates the same and passes into contact with the water to the maximum extent, said air moving against the water during its descent, its lateral movements, and its ascent, and then through the thick sprays of water which constantly ascend from and fall back into the body of same.

My invention comprises, therefore, more than merely passing air through water for absorbing moisture therefrom. It consists in a new principle of operation which embodies the driving of the air in large volume and under pressure down into a body of water with sufficient force to create a violent state of ebullition in said body and throw upwardly numerous sprays of water through which the air must pass on its escape from the receptacle, whereby the air is compelled to the maximum extent to move throughout the body of water and create such agitation in the same that the water itself is placed in action, repeatedly rushing outwardly from the air-pipe and by gravity returning toward the same and at the same time shooting upwardly with violence over the entire surface of the body of water, the result being that the entire body of water is utilized and that air in large volume may be very rapidly and efficiently moistened. The water within the receptacle should be warm in order to obtain the most rapid results. The air should also be driven into the body of water with such force that the moistened air will under the pressure thereby created and without any additional or facilitating means naturally leave the open upper end 1ᵃ of the receptacle, my invention dispensing with the use of suction or other means for withdrawing the air from the receptacle and, in fact, rendering the use of such means improper and a detriment.

The fact that the discharge end of the air-pipe 7 is submerged enables the water to offer a resistance to the air, but when the air-pressure becomes greater than the water resistance the water is forced by the air-pressure outwardly toward the side walls of the receptacle, returning by gravity to the middle of said receptacle in waves, only to be forced outwardly again and to return again, this back-and-forth action of the water continuing with the waves becoming smaller and smaller and finally becoming broken into small particles or spray.

I find it convenient to employ within the receptacle 1 two perforated screens 11 for preventing the sprays of water driven upwardly by the air from shooting out through the top of the receptacle.

What I claim as my invention, and desire to secure by Letters Patent, is—

1. The method hereinbefore described of moistening air which consists in driving the air in comparatively large volume and under pressure downwardly directly into a body of confined water with sufficient force to create a violent distribution of the air in and agitation of the water and cause portions of the water to shoot upwardly in the form of sprays, said air ascending through the water and falling sprays and passing off under initial pressure.

2. The method hereinbefore described of moistening air which consists in driving the air in comparatively large volume and under pressure downwardly directly into a body of confined water and causing the air to travel laterally therein with sufficient force to create a violent distribution of the air in and agitation of the water and cause portions of the water to shoot upwardly in the form of sprays, said air ascending through the water and falling sprays and passing off under initial pressure.

HARRY BENTZ.

Witnesses:
T. F. BOURNE,
L. SWINTON.